(12) United States Patent
Karlsen

(10) Patent No.: US 6,973,244 B2
(45) Date of Patent: Dec. 6, 2005

(54) CABLE WITH CREVICE CORROSION PROTECTION

(75) Inventor: Stian Karlsen, Halden (NO)

(73) Assignee: Nexans, Paris (FR)

(*) Notice: Subject to any disclaimer, the term of this patent is extended or adjusted under 35 U.S.C. 154(b) by 0 days.

(21) Appl. No.: 10/826,146

(22) Filed: Apr. 15, 2004

(65) Prior Publication Data
US 2004/0258374 A1 Dec. 23, 2004

(30) Foreign Application Priority Data
May 6, 2003 (NO) .................................. 2003 2028

(51) Int. Cl.$^7$ ................................................. G02B 6/44

(52) U.S. Cl. ...................... 385/100; 385/101; 385/106

(58) Field of Search ................................. 385/100, 101, 385/106, 107, 110

(56) References Cited

U.S. PATENT DOCUMENTS

| | | | |
|---|---|---|---|
| 4,701,575 A | 10/1987 | Gupta et al. ................. | 174/107 |
| 2002/0197029 A1 * | 12/2002 | Hershkowitz ................ | 385/99 |
| 2003/0026662 A1 * | 2/2003 | Vidal et al. .................. | 405/157 |
| 2004/0134662 A1 * | 7/2004 | Chitwood et al. ........... | 166/367 |
| 2004/0244982 A1 * | 12/2004 | Chitwood et al. ........... | 166/347 |

* cited by examiner

Primary Examiner—Kianni Kaveh
(74) Attorney, Agent, or Firm—Sofer & Haroun, LLP

(57) ABSTRACT

The invention relates to a cable comprising at least two elongated elements chosen from a group consisting of steel tubes (1, 2), optical fibre cables (3), electrical cables (4), and combinations thereof, arranged side by side within a common outer cover (5) along the length of the line and where at least one of the elongated elements (1, 2) has a passive metal outer surface, said outer cover (5) allowing entrance of corrosive agent to the interstices between elements, characterized in that at least one of the elements (1,2) with passive metal outer surface is provided with an outer layer (1A, 2A) formed of a material with open structure for water passage and having controlled thickness.

10 Claims, 1 Drawing Sheet

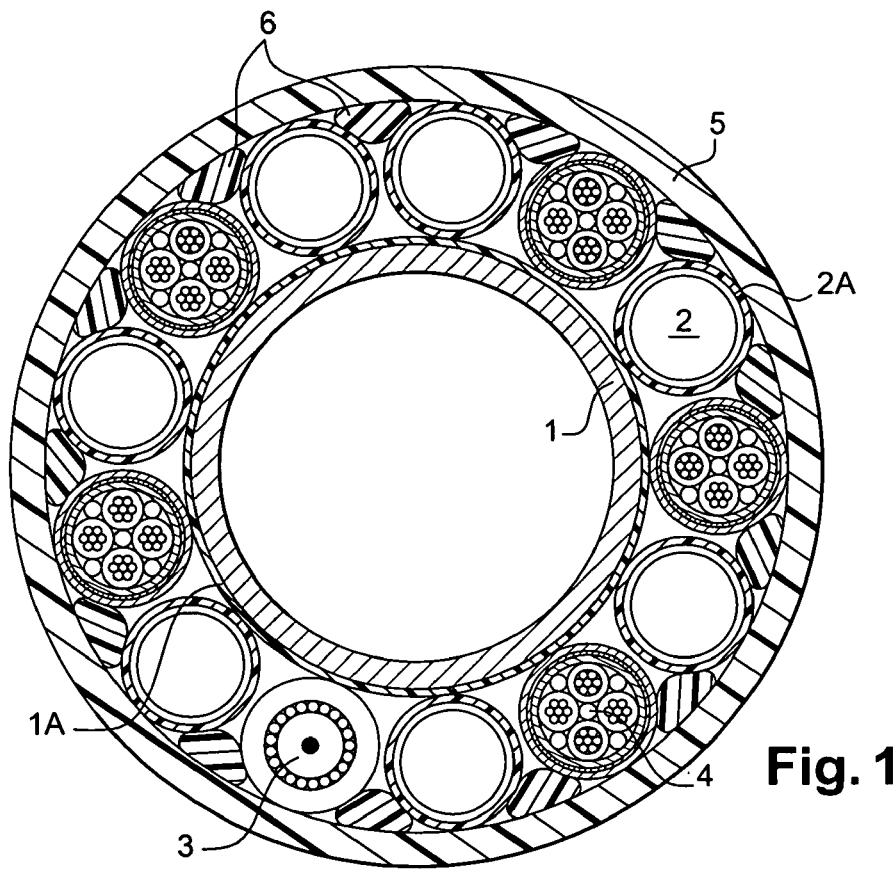
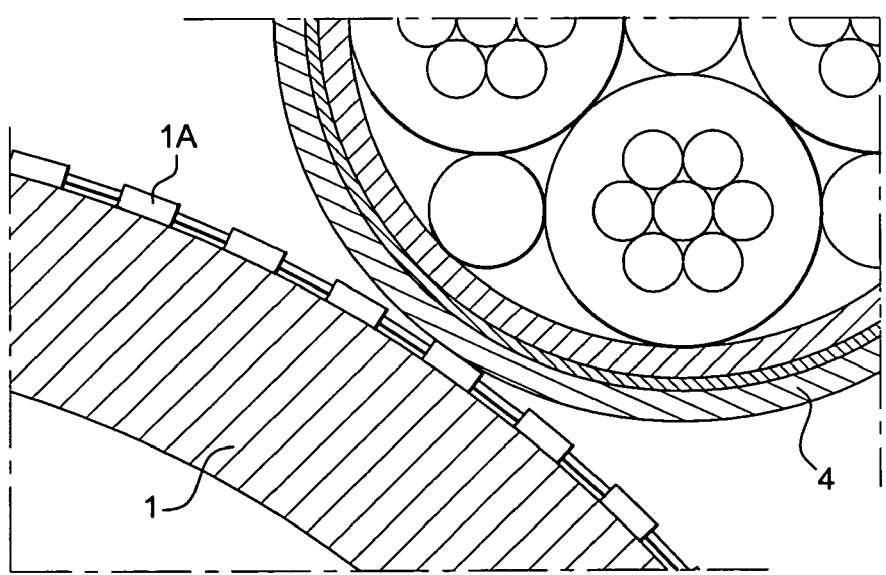

CABLE WITH CREVICE CORROSION PROTECTION

RELATED APPLICATION

This application is related to and claims the benefit of priority to Norwegian Patent Application No. 2003 2028, filed on May 6, 2003, the entirety of which is incorporated herein by reference.

The invention relates to a cable with crevice corrosion protection, specially a subsea line or umbilical.

In narrow crevices filled with corrosive fluid, there is a risk for a type of local corrosion, called crevice corrosion, on passive metals. Passive metal means here metal, which is not immune to the corrosive fluid that it is exposed to, but protected by a strong oxide layer produced by the alloy elements. This oxide layer produces a passive film on the metal that may be broken due to the sour conditions that comes into being in crevices. An example of such passive metal is super duplex steel.

Crevice corrosion appears when the following conditions are present: a crevice with a critical geometry, an oxidation agent, normally oxygen, and eventually chloride ions, which will reduce the initiation time and increase the corrosion rate.

The exchange of ions in the corrosive fluid between the volume inside and outside of a crevice will be limited, thereby causing reduction of oxygen and increasing of chloride concentration in the crevice. The smaller the crevice opening and the longer the crevice length, the more the exchange of ions will be prevented. In a crevice with a critical geometry, this mechanism will cause corrosion.

Subsea lines or umbilicals comprise a number of fluid/gas conducting steel tubes and other elongated elements like electrical conductors and cables enclosed within a common outer cover.

In subsea umbilicals, there are crevices between the elements. One or more of the elements in the umbilical might be hydraulic or injection tubes of a passive metal, most commonly super duplex steel. Seawater is a corrosive fluid that might fill the space and crevices between the elements.

In seawater the risk for crevice corrosion is increasing with increasing temperature. Crevice corrosion on super duplex steel is believed to be a potential problem in seawater at temperatures above 25 degree C.

The challenge has been to achieve corrosion protection of the super duplex steel tubes at temperatures above 25 degree C.

Most prior art solutions include an outer complete extruded polymer sheath over the concerned tubes. Such plastic coating minimizes the risk for crevice corrosion, by avoiding direct seawater access to the metal tubes.

But this arrangement is very dependent on the quality of the plastic sheath surrounding the tube. If there are openings in the plastic sheath, due to damage, these openings are of uncontrolled dimensions not allowing free water passage, so that crevice corrosion may still happen under the sheath, close to the openings.

The invention solves this technical problem and for that it relates to a cable comprising at least two elongated elements chosen from a group consisting of steel tubes, optical fibre cables, electrical cables, and combinations thereof, arranged side by side within a common outer cover along the length of the line and where at least one of the elongated elements has a passive metal outer surface, said outer cover allowing entrance of corrosive agent to the interstices between elements, characterized in that at least one of the elements with passive metal outer surface is provided with an outer layer formed of a material with open structure for water passage and having controlled thickness.

This outer layer will ease the transport of ions in the corrosive agent around the passive metal and thereby reduce local depletion of oxygen and local concentration of chloride ions. Thus crevice corrosion may be prevented.

In a first embodiment of the invention, said outer layer is of fibrous material.

Preferably, said outer layer is of a woven material.

The fibrous material of said outer layer can be chosen among synthetic fibres such as polyester, polyamide or combination of these materials,—or natural fibres such as cotton or other plant fibres or wool.

In a second embodiment of the invention, said outer layer is of a non-fibrous material with evenly distributed voids.

Said layer can consist of a tape wound around the surface or of a tape arranged longitudinally along the surface of the said element with passive metal outer surface.

Preferably, said layer has a thickness greater than 0.1 mm.

The invention relates to a subsea line like specified here above, corrosive agent being seawater.

A preferred embodiment of the invention is described with reference to drawings, which are not limitative.

FIG. 1 is a section view of a subsea line or umbilical conforming to the invention.

FIG. 2 shows a detail of a subsea line or umbilical conforming to the invention, in section view.

FIG. 1 shows an embodiment of a static subsea steel tube umbilical having a core 1 forming by an inner stainless steel tube, for example super duplex steel tube, and which may be a fluid pipe. This core 1 provides the centre element of the line when stranding other elongated elements such as hydraulic tubes 2 made of stainless steel, for example super duplex steel tube, optical fibre cables 3 and/or electrical cables 4 over the core 1.

Over the layer of tubes 2 and cables 3, 4, there are provided an outer protection layer 5 consisting of wound PP yarn or an extruded PE sheath. The line may include filler elements 6 limiting free space between longitudinal elements 2, 3, 4 of the line. In the embodiment of the invention shown in FIG. 1, the stainless steel core 1 has an outer diameter of 66 mm.

In this arrangement, the core 1 and the hydraulic tubes 2 are made of said passive metal, but more generally, all metal tubes in the line, like outer sheaths of optical fibre cable 3 and electrical cables 4 can be of passive metal like stainless steel.

Conforming to the invention, these elements with passive metal outer surface are provided with outer layer formed of a material with open structure for water passage and having controlled thickness. More precisely, the core 1 is provided with an outer layer 1A and the hydraulic tubes 2 with outer layers 2A creating space around the passive metal.

These outer layers 1A, 2A can be of a woven or no woven material of synthetic or natural fibre such as for example polyester, polyamide or combination of these materials,—or cotton or other plant fibres or wool.

These outer layers 1A, 2A can be of a no fibrous material with evenly distributed voids.

The FIG. 2 shows in detail such layer 1A around the core 1 formed by a woven material.

This layer can consist of a tape wound around the surface of the said element or of a tape arranged longitudinally along the surface of the said element with passive metal outer surface.

These layers create small openings between the tube of passive metal and the adjacent element. These small openings will ease the transport of ions in the seawater around the tube and thereby reduce local depletion of oxygen and local concentration of chloride ions.

In order to obtain the protection against crevice corrosion, the said layer must have an open structure for water passage and having controlled thickness. The thickness must be large enough to open up the crevice and obtain tensile strength during production and wear strength during service. The structure must be such that the water can pass between the metal and the adjacent element.

Preferably, said layer has a thickness of at least 0.1 mm.

Grease or dirt might cover the openings in the layer 1A, 2A and prevent water penetration. This should however easily be avoided by proper care during umbilical production.

In the here above described embodiment, the outer layer 1A, 2A is provided around the element with passive metal outer surface. More generally, it can be provided between the element with passive metal outer surface and the adjacent element, around element with passive metal outer surface and/or around adjacent element.

In the here above described embodiment, the cable is a subsea line or umbilical but the invention can be applied in all types of cable comprising at least two elongated elements chosen from a group consisting of tubes, electrical cables, optical fibre cables and combinations thereof, arranged side by side within a common outer cover along the length of the line and where at least one of the elongated elements has a passive metal outer surface, said outer cover allowing entrance of corrosive agent to the interstices between elements, an outer layer being provided between said element with passive metal outer surface and an adjacent element. Examples of such cables are cables exposed to sour and corrosive water like cables in watering earth like bog.

What is claimed is:

1. Cable comprising:
   at least two elongated elements chosen from the group of steel tubes, optical fibre cables, electrical cables, and combinations thereof; arranged side by side within a common outer cover along a length of a line; and
   wherein at least one of the elongated elements has a passive metal outer surface, said outer cover allowing entrance of corrosive agent to the interstices between elements, wherein at least one of the elements with passive metal outer surface is provided with an outer layer formed of a material with open structure for water passage and having controlled thickness.

2. Cable according to claim 1, wherein said outer layer is of fibrous material.

3. Cable according to claim 2, wherein said outer layer is of woven material.

4. Cable according to claim 2, wherein the fibrous material of the outer layer is chosen among synthetic fibres such as polyester, polyamide or combination of these materials.

5. Cable according to claim 2, wherein the fibrous material of the outer layer is chosen among natural fibres such as cotton or other plant fibres or wool.

6. Cable according to claim 1, wherein said outer layer is of a material with distributed voids.

7. Cable according to claim 1, wherein said outer layer consists of a tape wound around the surface of the said element with passive metal outer surface.

8. Cable according to claim 1, wherein said outer layer consists of a tape arranged longitudinally along the surface of the said element with passive metal outer surface.

9. Cable according to claim 1, wherein said outer layer has a minimum thickness of 0.1 mm.

10. Subsea line according to claim 1, wherein said corrosive agent is seawater.

* * * * *